(12) United States Patent
Asheghian et al.

(10) Patent No.: US 8,281,403 B1
(45) Date of Patent: Oct. 2, 2012

(54) METHODS AND SYSTEMS FOR EVALUATING THE HEALTH OF COMPUTING SYSTEMS BASED ON WHEN OPERATING-SYSTEM CHANGES OCCUR

(75) Inventors: Daniel Asheghian, Los Angeles, CA (US); Robert Conrad, Culver City, CA (US); Christopher Peterson, Culver City, CA (US); Chris Sakuma, Monterey Park, CA (US)

(73) Assignee: Symantec Corporation, Mountain View, CA (US)

( * ) Notice: Subject to any disclaimer, the term of this patent is extended or adjusted under 35 U.S.C. 154(b) by 580 days.

(21) Appl. No.: 12/476,782

(22) Filed: Jun. 2, 2009

(51) Int. Cl.
*G06F 21/00* (2006.01)

(52) U.S. Cl. .......... 726/25; 709/203; 709/225; 709/226; 713/191; 705/400

(58) Field of Classification Search ............... 726/25
See application file for complete search history.

(56) References Cited

U.S. PATENT DOCUMENTS

| | | | |
|---|---|---|---|
| 2003/0229890 A1* | 12/2003 | Lau et al. | 717/168 |
| 2004/0230828 A1* | 11/2004 | DeFuria et al. | 713/200 |
| 2007/0143827 A1* | 6/2007 | Nicodemus et al. | 726/2 |
| 2007/0143851 A1* | 6/2007 | Nicodemus et al. | 726/25 |
| 2007/0233865 A1* | 10/2007 | Garbow et al. | 709/226 |
| 2008/0141240 A1* | 6/2008 | Uthe | 717/174 |
| 2009/0007223 A1* | 1/2009 | Centonze et al. | 726/1 |
| 2010/0046553 A1* | 2/2010 | Daigle et al. | 370/474 |

OTHER PUBLICATIONS

A Comparative Evaluation of Two Algorithms for Windows Registry Anomaly Detection| http://www.gatsby.ucl.ac.uk/~heller/CompareEval.pdf| Salvatore J. Stolfo, Frank Apa| Columbia University, New York NY.*
Satish, Sourabh; U.S. Appl. No. 12/056,379, filed Mar. 27, 2008.
Satish, Sourabh; U.S. Appl. No. 12/049,751, filed Mar. 17, 2008.
Nachenberg, Carey S.; U.S. Appl. No. 12/415,834, filed Mar. 31, 2009.
"Cisco IronPort Web Reputation Filters"; (accessed May 19, 2009); Cisco; http://www.ironport.com/pdf/ironport_wbrs_datasheet.pdf.
"Cisco IronPort S-Series Web Security Appliances"; (accessed May 19, 2009); Cisco; http://www.ironport.com/pdf/ironport_s-series_datasheet.pdf.

* cited by examiner

*Primary Examiner* — Taghi Arani
*Assistant Examiner* — Mahfuzur Rahman
(74) *Attorney, Agent, or Firm* — Advantedge Law Group

(57) ABSTRACT

A computer-implemented method for evaluating the health of computing systems based on when operating-system changes occur is disclosed. In one example, this method may include: 1) identifying an operating-system change made to a computing system, 2) determining when the operating-system change occurred, and then 3) assessing the health of the computing system based at least in part on when the operating-system change occurred. Various other methods, systems, and computer-readable media are also disclosed.

18 Claims, 8 Drawing Sheets

System-Health Assessment 400

| Operating-System-Change Information 410 | |
|---|---|
| Days Since Operating-System Installation | 326 |
| Days Since Operating-System Update | 21 |
| Days Since Operating-System Upgrade | 325 |
| Days Since Security-Software Installation | 215 |

412 } 414

| Performance Information 420 | |
|---|---|
| Running Average of CPU Usage | 2.1875 |
| Maximum CPU Usage | 7 |
| Running Average of Page Faults | 248.4375 |
| Maximum Number of Page Faults | 844 |
| Running Average of IP Datagrams | 3.2500 |
| Maximum Number of IP Datagrams | 8 |

422 } 424

| Stability Information 430 | |
|---|---|
| Running Average of Blue-Screen Errors | 0 |
| Running Average of Service Errors | 1 |
| Running Average of Application Errors | 1 |

METHODS AND SYSTEMS FOR EVALUATING THE HEALTH OF COMPUTING SYSTEMS BASED ON WHEN OPERATING-SYSTEM CHANGES OCCUR

BACKGROUND

In recent years, malicious software developers have attempted to proliferate malware by generating thousands or potentially millions of variations of malicious files. Because many existing anti-virus technologies detect malicious files by identifying a unique digital signature or fingerprint for each variation of a malicious file (a technique known as blacklisting), conventional anti-virus technologies have struggled to protect computing resources from such malware due to their inability to quickly and correctly identify the digital signatures for each of the potentially millions of variations of malicious files.

Due to these limitations, some security-software vendors have turned to whitelisting technologies. In a whitelisting system, computing systems may only access or execute applications or files on a preapproved whitelist. Security-software vendors may create whitelists either manually or automatically, such as through the use of web-spidering techniques. However, given the high number of new files and applications created and published on a daily basis, many security-software vendors have struggled with manually creating comprehensive whitelists. Moreover, many automatic techniques for creating whitelists only identify a portion of known legitimate files. Conventional automatic techniques are also prone to falsely identifying illegitimate files as legitimate, and vice-versa, further limiting the viability of a whitelist generated using such a technique.

In light of these deficiencies, at least one security-software vendor has begun investigating reputation-based security schemes. In a reputation-based security system, a security-software vendor may attempt to determine the trustworthiness of a file by collecting, aggregating, and analyzing data from potentially millions of user devices within a community, such as the security-software vendor's user base. For example, by determining a file's origin, age, and prevalence within the community (such as whether the file is predominantly found on at-risk or "unhealthy" machines within the community), among other details, a security-software vendor may gain a fairly accurate understanding as to the trustworthiness of the file.

SUMMARY

As will be described in greater detail below, the instant disclosure generally relates to systems and methods for assessing the health or overall wellness (i.e., the performance, stability, and/or state of security) of a computing system based on when operating-system changes (such as operating-system installations, patches, upgrades, or the like) made to the computing system occurred. In one example, an exemplary method for performing such a task may include: 1) identifying an operating-system change made to a computing system, 2) determining when the operating-system change occurred, and then 3) assessing the health of the computing system based at least in part on when the operating-system change occurred.

For example, since recently installed operating systems are generally less likely to have performance, stability, and/or security-related issues than operating systems that have been in use for some time, in some examples the systems and methods disclosed herein may assess the health of a computing system based at least in part on how many days have passed since an operating system on the computing system was installed (which may be determined by, for example, retrieving the operating system's installation time from a local registry entry).

In addition, the systems and methods disclosed herein may assign health scores to computing systems based on a gradient that specifies that the closer the current date is to when the operating-system change in question occurred (such as the installation date of an operating system), the better the health score. These systems and methods may also specify that, after a threshold number of days have passed since the operating-system change in question occurred, the health score of a computing system may reach its lowest point.

In certain embodiments, the systems and methods disclosed herein may use the results of these health assessments to determine if applications and/or files are more or less likely to be malicious. For example, if a file is predominantly located on "healthy" computing systems (i.e., computing systems with high health scores and/or good health assessments) within a user base or enterprise, the systems and methods disclosed herein may determine that this file is most likely safe and assign a high reputation score to the same.

By assessing the health of a computing system based at least in part on when various operating-system changes made to the computing system occurred, the systems and methods described herein may be able to efficiently and accurately assess the state of health of computing systems. As will be explained, these health assessments may enable security-software vendors to quickly and accurately predict the trustworthiness of a file or application, which may in turn enable security-software vendors to offer enhanced protection against malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of a system-health assessment of a computing system according to at least one embodiment.

Figure 1:
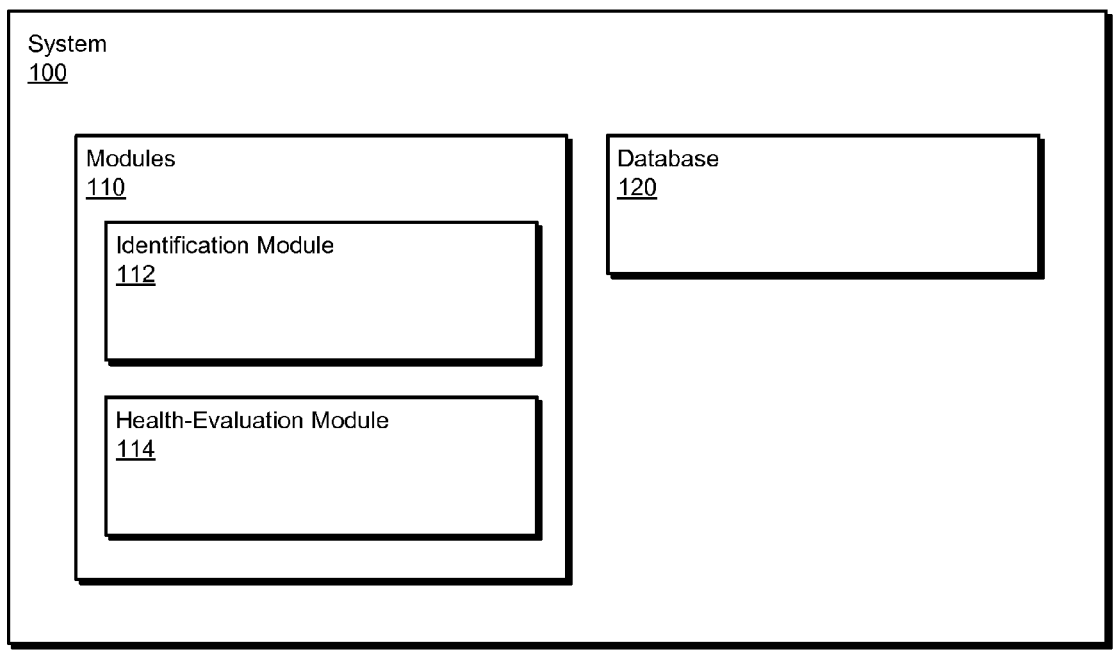
FIG. 1 is a block diagram of an exemplary system for evaluating the health of computing systems based on when operating-system changes occur.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure describes various methods and systems for evaluating or assessing the health of computing systems based on when operating-system changes (such as operating-system installations, updates, patches, upgrades, or the like) occur. For the purposes of this disclosure, the "health" of a computing system may refer to the overall wellness (i.e., the performance, stability, and/or state of security) of the computing system.

Figure 2:
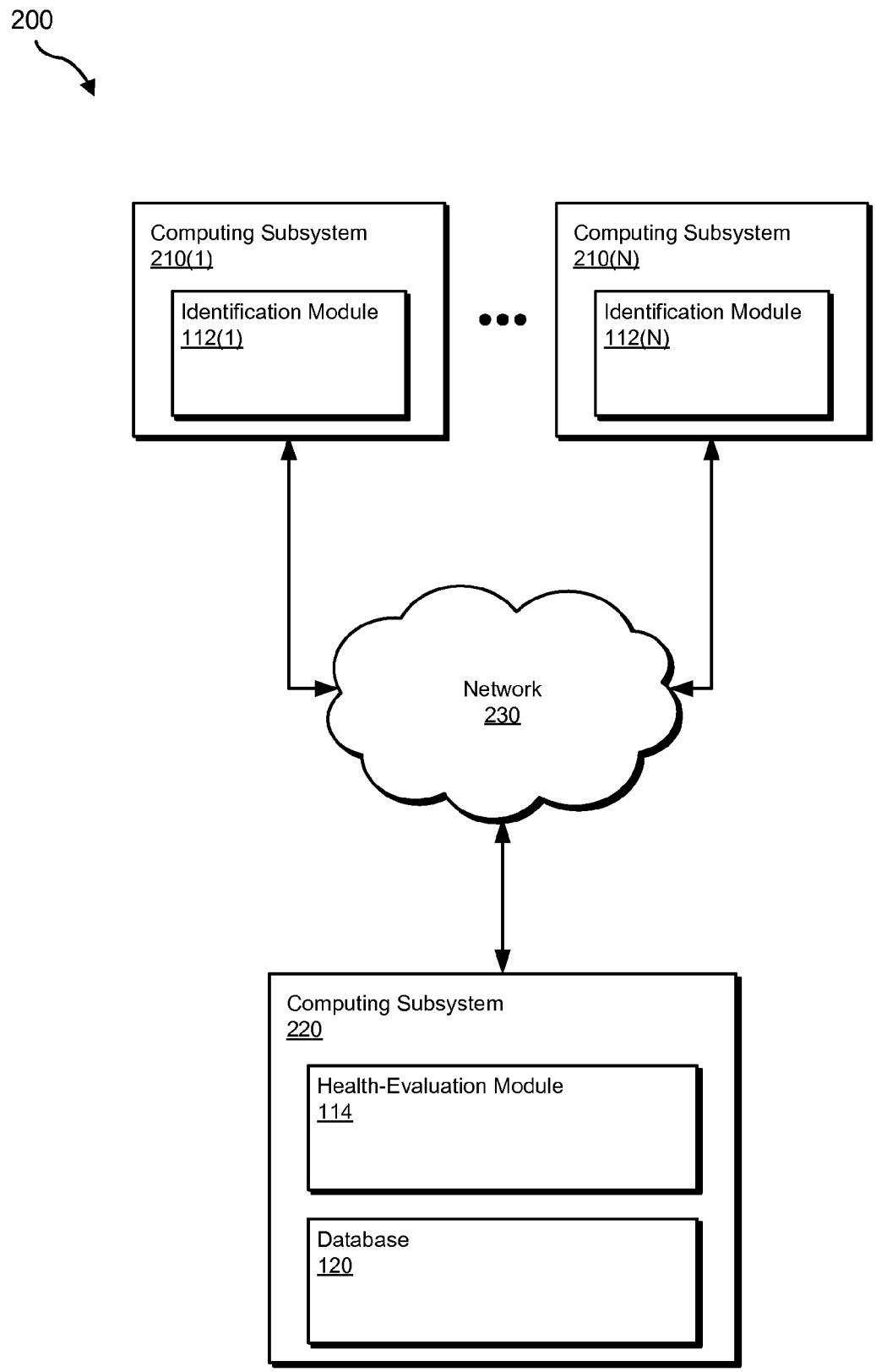
FIG. 2 is a block diagram of another exemplary system for evaluating the health of computing systems based on when operating-system changes occur.

The following will provide, with reference to FIGS. 1 and 2, detailed descriptions of exemplary systems for evaluating the health of computing systems based on when operating-system changes occur. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 illustrates an exemplary system 100 for evaluating the health of computing systems based on when operating-system changes occur. As illustrated in this figure, exemplary system 100 may include one or more modules for performing one or more tasks. For example, and as will be explained in greater detail below, exemplary system 100 may include an identification module 112 programmed to identify and date operating-system changes (such as operating-system installations, updates, or upgrades, as will be described in greater detail below) made to a computing system. Exemplary system 100 may also include a health-evaluation module 114 programmed to assess the health of a computing system based at least in part on when such operating-system changes occurred.

In certain embodiments, one or more of modules 110 in FIG. 1 may represent one or more software applications or programs that, when executed by a computing device, may cause the computing device to perform one or more tasks. For example, as will be described in greater detail below, one or more of modules 110 may represent software modules stored and configured to run on one or more computing devices, such as the devices illustrated in FIG. 2 (e.g., computing subsystems 210(1)-(N) and/or computing subsystem 220), computing system 710 in FIG. 7, and/or portions of exemplary network architecture 800 in FIG. 8. One or more of modules 110 in FIG. 1 may also represent all or portions of one or more special-purpose computers configured to perform one or more tasks.

As illustrated in FIG. 1, system 100 may also include a database 120. Database 120 generally represents any type or form of storage device or medium capable of storing data. As will be explained in greater detail below, database 120 may store system-health assessments, system-health scores, and/or any other information associated with evaluating the health of computing systems.

Database 120 in FIG. 1 may represent a portion of one or more computing devices. For example, database 120 may represent a portion of one or more of the subsystems illustrated in FIG. 2 (e.g., computing subsystems 210(1)-(N) and/or computing subsystem 220), computing system 710 in FIG. 7, and/or portions of exemplary network architecture 800 in FIG. 8. Alternatively, database 120 in FIG. 1 may represent one or more physically separate devices capable of being accessed by a computing device, such as one or more of the subsystems illustrated in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of a cloud or network-based system, such as the exemplary network-based system 200 illustrated in FIG. 2. As shown in FIG. 2, system 200 may include a plurality of computing subsystems 210(1)-210(N) in communication with a computing subsystem 220 via a network 230.

Computing subsystems 210(1)-(N) and 220 generally represent any type or form of computing device capable of reading computer-executable instructions. Examples of computing subsystems 210(1)-(N) and 220 include, without limitation, laptops, desktops, servers, cellular phones, personal digital assistants ("PDAs"), multimedia players, embedded systems, combinations of one or more of the same, exemplary computing system 710 in FIG. 7, or any other suitable computing device. In one example, computing subsystem 220 may represent a server or backend configured to assess the health of a plurality of client-side computing subsystems, such as computing subsystems 210(1)-(N). In this example, computing subsystems 210(1)-(N) may represent all or a portion of a single community or a plurality of communities. For example, computing subsystems 210(1)-(N) may represent computing systems within a single or a plurality of user bases, a single or a plurality of enterprises, or portions or combinations of one or more of the same.

As shown in FIG. 2, an identification module stored and configured to run on each of computing subsystems 210(1)-(N) may be programmed to identify and date operating-system changes (such as operating-system installations, updates, or upgrades) made to computing subsystems 210(1)-(N). For example, as will be described in greater detail below, an identification module 112(1) stored and configured to run on computing subsystem 210(1) may: 1) identify one or more operating-system changes made to computing subsystem 210(1), 2) determine when these operating-system changes occurred, and then 3) send information specifying when these operating-system changes occurred to a health-evaluation module 114 (which, in this example, is located on computing subsystem 220 in FIG. 2). Although illustrated as part of computing subsystem 220 in FIG. 2, in some examples health-evaluation module 114 may be stored on one or more of computing subsystems 210(1)-(N).

Health-evaluation module 114 may then assess the health of computing subsystem 210(1) based on when the identified operating-system changes occurred. For example, health-evaluation module 114 may calculate or adjust a system-health score for computing subsystem 210(1) based at least in part on how much time has passed since an operating system running on computing subsystem 210(1) was installed.

In certain embodiments, health-evaluation module 114 may store various forms of information in database 120. For example, health-evaluation module 114 may store system-health assessments, system-health scores, and/or any other information used to determine the health of computing subsystems 210(1)-(N) in database 120, as will be described in greater detail below. Although illustrated as part of computing subsystem 220 in FIG. 2, in some examples database 120 may represent a portion of one or more of computing subsystems 210(1)-(N).

As mentioned above, computing subsystems 210(1)-(N) and computing subsystem 220 may communicate over network 230. Network 230 generally represents any medium or architecture capable of facilitating communication or data transfer. Examples of network 230 include, without limitation, an intranet, a wide area network ("WAN"), a local area network ("LAN"), a personal area network ("PAN"), the Internet, power line communications ("PLC"), a cellular network (e.g., a GSM network), exemplary network architecture 800 in FIG. 8, or the like. Network 230 may facilitate communication or data transfer using wireless and/or wired connections.

Figure 3:
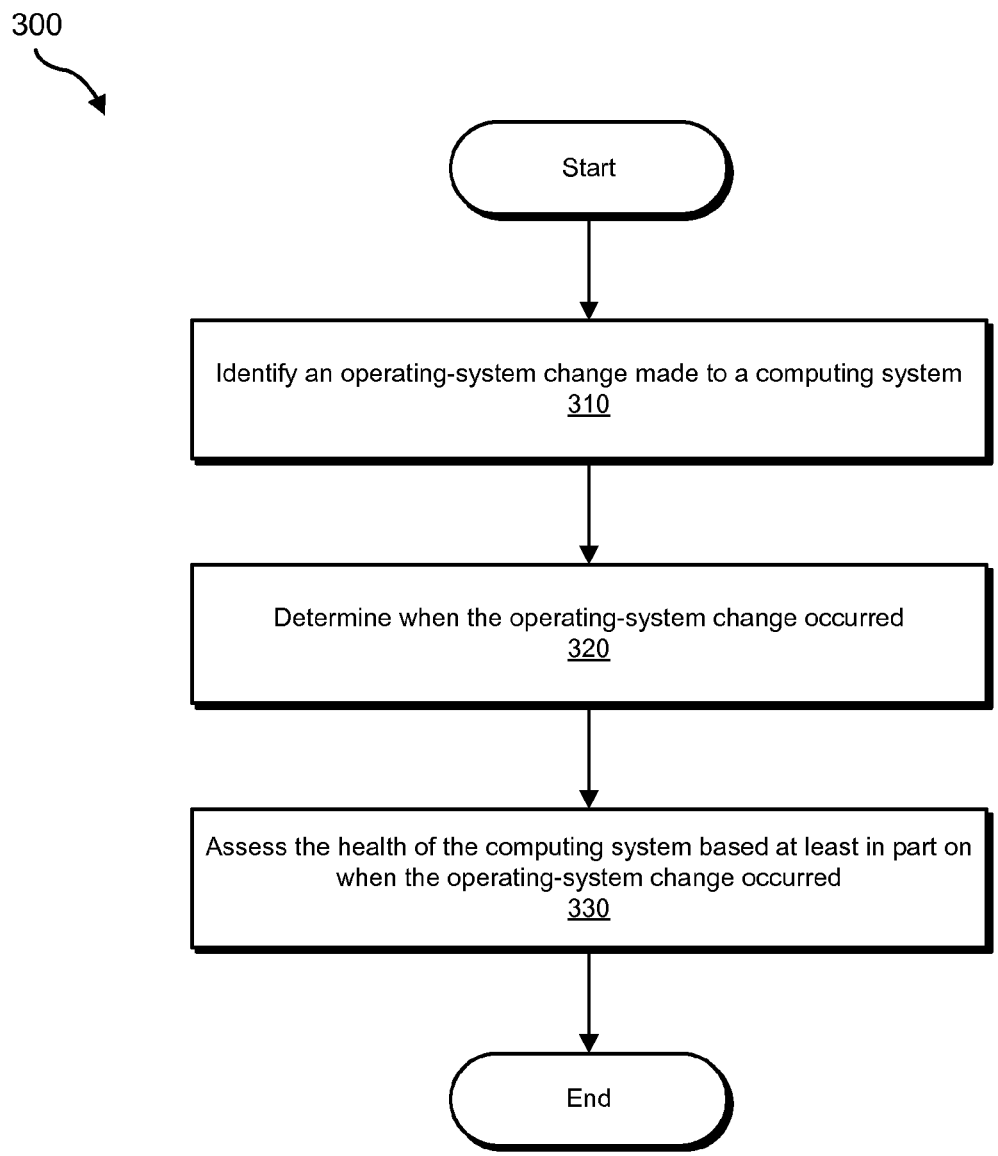
FIG. 3 is a flow diagram of an exemplary method for evaluating the health of computing systems based on when operating-system changes occur.

FIG. 3 shows an exemplary method for evaluating the health of computing systems based on when operating-system changes occur. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2, as will be explained in greater detail below.

At step 310 in FIG. 3, the system may identify an operating-system change made to a computing system. For example, identification module 112(1) in FIG. 2 may identify an operating-system change made to computing subsystem 210(1). As used herein, the term "operating-system change" may refer to any change made to an operating system that may affect, or be used to assess the health of, a computing system. Examples of operating-system changes include, without limitation, the installation of an operating system, an operating-system update (e.g., any patch that remedies operating-system bugs and/or vulnerabilities), an operating-system upgrade (e.g., a service pack, a collection of updates, fixes, enhancements, and/or any other means of bringing an operating system up to date), a security-software installation, or any other operating-system change.

In some examples, an operating-system change may also refer to a potential operating-system change, such as operating-system or security-software patches, updates, or upgrades released by software vendors. For example, identification module 112(1) in FIG. 2 may identify an operating-system patch, update, or upgrade released and applicable to, but not installed on, computing subsystem 210(1). As will be explained in greater detail below, potential operating-system changes such as these may be relevant to the health of a computing system since a computing system that does not promptly install such updates and/or upgrades may be vulnerable for a longer period of time and, therefore, more likely to be infected by malware than a computing system that installs updates and/or upgrades as they become available.

Identification module 112(1) may identify operating-system changes on computing subsystem 210(1) in a variety of ways. For example, identification module 112(1) may: 1) examine a registry and/or other system database of computing subsystem 210(1) for entries that identify or relate to operating-system changes, 2) scan computing subsystem 210(1) for files associated with operating-system changes, 3) use a signature or fingerprint-based heuristic to determine the state or version of various operating-system files located on computing subsystem 210(1), 4) detect operating-system changes when they occur, and/or 5) use any other suitable means for identifying operating-system changes.

Identification module 112(1) may identify operating-system changes at any suitable time. For example, identification module 112(1) may identify an operating-system change when the operating-system change occurs, each time a system's health is assessed, when health-evaluation module 114 requests information about the operating-system change, when identification module 112(1) first runs on the computing system, at regular or irregular intervals, and/or at any other suitable time.

After an operating-system change has been identified in step 310, at step 320 the system may determine when this operating-system change occurred. For example, identification module 112(1) in FIG. 2 may determine when the operating-system change identified in step 310 was made to computing subsystem 210(1).

Identification module 112(1) may perform step 320 in a variety of ways. For example, identification module 112(1) may determine when an operating-system change occurred by: 1) reading the time of the operating-system change from the registry of computing subsystem 210(1), 2) determining when a system file associated with the operating system was created, 3) determining when a system file associated with the operating system was last modified, 4) reading the time of the operating-system change from a system log file, 5) recording the time of the operating-system change after detecting the operating-system change as it occurs, and/or 6) using any other means of determining when the operating-system change occurred. For example, if the operating-system change identified in step 310 represents the installation of a MICROSOFT WINDOWS operating system, identification module 112(1) may determine when this operating system was installed by retrieving the operating system's installation time, as the number of seconds since Jan. 1, 1970, from the registry entry HKEY_LOCAL_MACHINE\SOFTWARE\MICROSOFT\WINDOWSNT\CURRENTVERSION\InstallDate.

Identification module 112(1) may quantify when an operating-system change occurred in a variety of ways. For example, identification module 112(1) may capture a value indicating when the operating-system change occurred as a date, as the number of years, days, hours, minutes, or seconds that have passed since a specific date (e.g., an operation-system installation date), and/or in any other suitable manner.

In certain embodiments, identification module 112(1) may store a value indicating when an operating-system change occurred in a database (e.g., database 120 in FIG. 1) to be retrieved at a later time. In some instances, the value indicating when the operating-system change occurred may be incorrect (possibly caused by the time on computing subsystem 210(1) being incorrect). In this example, identification module 112(1) may adjust the value indicating when the operating-system change occurred, as it was first determined, to compensate for the incorrect time.

In order to ensure that identification module 112(1) correctly determines when an operating-system change occurred, identification module 112(1) may also protect, against tampering, any or all data that may indicate when an operating-system change occurred. For example, identification module 112(1) may protect such data by setting this data as read-only, by recording the time of an operating-system change at the moment it occurs, by storing values in a protected database, by backing up such data, by sending determined values to a server (e.g., computing subsystem 220 in FIG. 2), and/or by any means necessary to protect such data. In some embodiments, upon performing steps 310 and 320 in FIG. 3, identification module 112(1) on computing subsystem 210(1) may send, to health-evaluation module 114 on computing subsystem 220 in FIG. 2, information specifying what operating-system change occurred and when the change occurred.

At step 330, the system may assess the health of the computing system based at least in part on when the operating-system change identified in step 310 occurred. For example, health-evaluation module 114 on computing subsystem 220 in FIG. 2 may assess the health of computing subsystem 210(1) based at least in part on when the operating-system change identified in step 310 occurred. Upon completion of step 330, exemplary method 300 in FIG. 3 may terminate.

Health-evaluation module 114 may assess the health of a computing system in a variety of ways. In one example, health-evaluation module 114 may assess the health of a computing system based solely on when the operating-system change identified in step 310 occurred. For example, since recently installed operating systems are generally less likely to have performance, stability, and/or security-related issues than operating systems that have been in use for some time, in some examples health-evaluation module 114 may assess the health of computing subsystem 210(1) based at least in part on how many days have passed since an operating system on computing subsystem 210(1) was installed.

Similarly, since a computing system that does not promptly install operating-system or security-software updates, patches, and/or upgrades may be vulnerable for a longer period of time and, therefore, more likely to be infected by malware than a computing system that installs updates, patches, and/or upgrades as they become available, in some examples health-evaluation module 114 may assess the health of computing subsystem 210(1) in FIG. 2 based at least in part on how many days passed between when an operating-system or security-software update, patch, or upgrade was made available and when computing subsystem 210(1) installed this update, patch, or upgrade.

In other examples, operating-system-change information (i.e., information that identifies when various operating-system changes were made to a computing system) may be combined with a variety of additional forms of information when assessing the health of a computing system. For example, health-evaluation module 114 may assess the health of computing subsystem 210(1) by analyzing both: 1) the stability, performance, and/or state of security of computing subsystem 210(1) and 2) any operating-system changes made to computing subsystem 210(1). FIG. 4 illustrates the results of such an exemplary health assessment. As illustrated in this figure, system-health assessment 400 may include operating-system-change information 410, performance information 420, and stability information 430.

In certain embodiments, operating-system-change information 410 may include a plurality of operating-system-change metrics 412 and results 414 for each of these metrics. Operating-system-change metrics 412 generally represent any type of metric that may be used to measure or quantify operating-system changes made to a computing system. Examples of values that operating-system-change metrics may measure include, without limitation, when an operating-system installation occurred, when an operating-system update occurred, when an operating-system upgrade occurred, when a security-software installation occurred, and/or any other measurement of when an operating-system change occurred. In the example provided in FIG. 4, operating-system-change information 410 may detail the number of days since an operating-system installation (in this example, 326), the number of days since an operating-system update (21), the number of days since an operating-system upgrade (325), and the number of days since a security-software installation (215).

Similar to operating-system-change information 410, performance information 420 may include a plurality of performance metrics 422 and results 424 for each of these metrics. Performance metrics 422 may include any type of metric that may be used to measure the performance of a computing system. Examples of values that performance metrics may measure may include CPU usage, page faults, network usage (such as the number of IP datagrams sent or received), and memory usage.

In the example provided in FIG. 4, performance information 420 details the computing system's maximum and average CPU usage during the assessment period (in this case, 7 and 2.1875, respectively), the maximum and average number of page faults experienced by the system during the assessment period (844 and 248.4375, respectively), and the maximum and average number of IP datagrams sent and received by the system during the assessment period (8 and 3.25, respectively).

As with operating-system-change information 410 and performance information 420, stability information 430 may include a plurality of stability metrics 432 and results 434 for each of these metrics. Stability metrics 432 may include any type or form of metric that may be used to measure the stability of a computing system. Examples of values that stability metrics may measure include, without limitation, operating-system errors (such as blue-screen errors), application errors (such as application hangs or freezes), service errors, device-driver errors, system uptime, and system reboots (such as the number of system reboots per day).

In the example provided in FIG. 4, stability information 430 may detail the average number of blue-screen errors identified by health-evaluation module 114 during the assessment period (in this case, 0), the average number of service errors identified by health-evaluation module 114 (in this case, 1), and the average number of application errors identified by health-evaluation module 114 (in this case, 1). As illustrated in FIG. 4, the results 414, 424, and 434 of operating-system-change metrics 412, performance metrics 422, and stability metrics 432, respectively, may be represented using running averages, maximum or peak values, incremental count values, or any other suitable method.

In one example, health-evaluation module 114 may quantify the health of computing subsystem 210(1) by calculating an overall system-health score for computing subsystem 210(1) based on the information contained in system-health assessment 400 in FIG. 4. As used herein, the phrase "system-health score" may refer to a quantifier used to identify or describe the overall health of a computing system. Examples of system-health scores include a number on a scale (e.g., 70, on a scale of 1-100), a number representing a percentage of health (e.g., 70%, on a scale of 0-100%), or any other quantifier that may be used to express the health of a computing system.

In some examples, health-evaluation module 114 may calculate a system-health score for computing subsystem 210(1) based solely on operating-system-change information 410 in FIG. 4. For example, health-evaluation module 114 may: 1) assign weighted values to each of metrics 412, 2) respectively apply these weighted values to the results 414 of these metrics, and then 3) sum these weighted results to arrive at an overall system-health score.

In other examples, health-evaluation module 114 may calculate a system-health score for computing subsystem 210(1) based on operating-system-change information 410, performance information 420, and/or stability information 430 in FIG. 4. For example, health-evaluation module 114 may: 1) assign weighted values to each of metrics 412, 422, and 432, 2) respectively apply these weighted values to the results 414, 424, and 434 of these metrics, and then 3) sum these weighted results to arrive at an overall system-health score.

A system-health score may also include a plurality of quantifiers that are based on all or part of a system-health assessment (e.g., system-health assessment 400 in FIG. 4). For example, a system-health score may include results from system-health assessment 400, an operating-system-change score, a performance score, a stability score, a security score, and/or any other value that may quantify or express the health of a computing system.

In some examples, health-evaluation module 114 may simply adjust a preexisting system-health score associated with a computing system based on when the operating-system change identified in step 310 occurred. For example, health-evaluation module 114 may reduce a preexisting system-health score associated with computing subsystem 210(1) in FIG. 2 by one percent for every 50 days that have passed since the operating system running on computing subsystem 210(1) was installed. Similarly, health-evaluation module 114 may adjust a preexisting system-health score associated with computing subsystem 210(1) based on a gradient, curve, or an equation of a curve that relates how much the system-health score should be adjusted to the amount of time that has passed since the operating-system change identified in step 310 occurred.

In some examples, health-evaluation module 114 may limit any such adjustment by a predetermined threshold. For example, health-evaluation module 114 may limit the adjustment of a computing system's system-health score to a maximum of 50%—i.e., the system-health score of a computing system may only be reduced by a maximum of 50% based on operating-system-change information. Similarly, health-evaluation module 114 may limit the adjustment of a computing system's system-health score by a predetermined threshold that specifies that after a predetermined number of days have passed since installation of the system's operating system, the system's system-health score has reached its lowest point.

Health-evaluation module 114 may also use additional information that correlates the amount of time that has passed since an operating-system change with the health of the computing system to determine the adjustments, threshold, and/or gradients mentioned above. Examples of such information may include the probability of infection after a certain number of days, the times of other operating-system changes, the number of actions associated with the operating-system change that have happened, and/or any other relevant information. Health-evaluation module 114 may also assess the health of computing subsystem 210(1) using any number of additional heuristics, formulas, and/or methods.

Health-evaluation module 114 may assess the health of computing subsystem 210(1) at a variety of intervals. For example, health-evaluation module may assess the health of the computing system once a day, once a week, and/or once a month. Health-evaluation module 114 may also perform the assessment at irregular intervals. For instance, health-evaluation module 114 may perform the assessment after receiving information specifying when an operating-system change occurred from identification module 112(1) on computing subsystem 210(1). Health-evaluation module 114 may also perform the evaluation at any other time, as will be discussed in greater detail below.

As detailed previously, an operating-system change may include a security-software installation. In some examples, to better assess the health of a computing system, health-evaluation module 114 may compare the time of a security-software installation with the time of another operating-system change, such as an operating-system installation. For example, since security software regularly protects computing systems against various forms of malware, health-evaluation module 114 may compare the time when a computing system's operating system was installed with the time when security software was subsequently installed on the system in order to determine how long the computing system was unprotected. Health-evaluation module 114 may then use this information to color or assess the health of the computing system, as will be explained in greater detail below.

Figure 5:
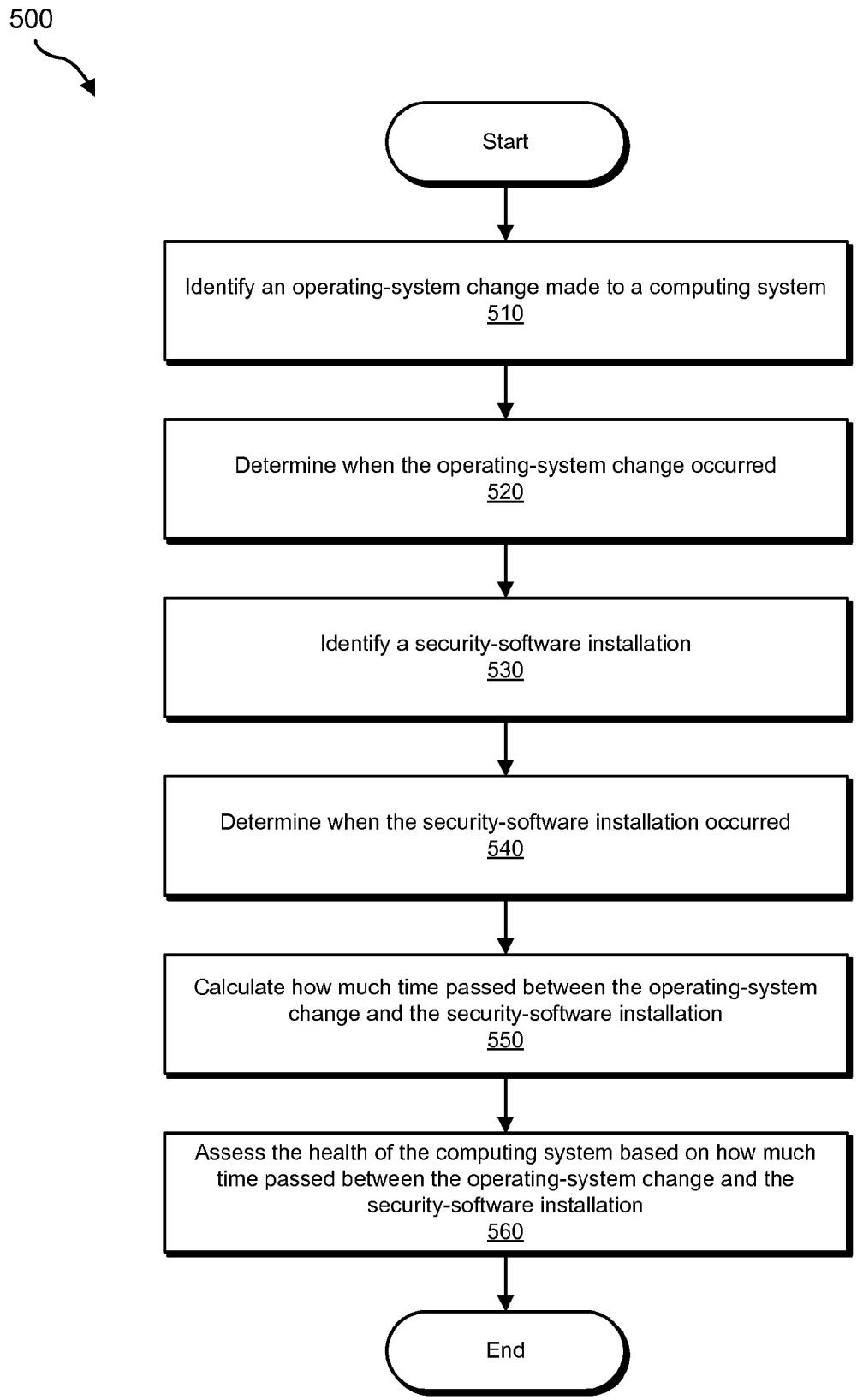
FIG. 5 is a flow diagram of an exemplary method for evaluating the health of computing systems based on when security-software installations occur.

FIG. 5 illustrates an exemplary method 500 for evaluating the health of computing systems based on when a security-software installation occurs in relation to another operating-system change. FIG. 5 may be performed by any suitable computer-executable code and/or computing system. In some embodiments, the steps shown in FIG. 5 may be performed by one or more of the components of system 100 in FIG. 1 and/or system 200 in FIG. 2, as will be explained in greater detail below.

For example, at step 510 identification module 112(1), located on computing subsystem 210(1) in FIG. 2, may identify an operating-system change (e.g., an operating-system installation) made to computing subsystem 210(1). At step 520, identification module 112(1) may determine when the operating-system change identified in step 510 occurred.

At step 530, identification module 112(1) may also identify a security-software installation on computing subsystem 210(1). At step 540, identification module 112(1) may determine when the security-software installation identified in step 530 occurred. Steps 510, 520, 530, and 540 may be similar to steps 310 and 320 of FIG. 3. Therefore, the discussion of steps 310 and 320 may also apply to steps 510, 520, 530, and 540.

At step 550, health-evaluation module 114 may calculate how much time passed between the operating-system change identified in step 510 and the security-software installation identified in step 530. In some embodiments, health-evaluation module 114 may calculate how much time passed as part of assessing the health of a computing system. As such, the amount of time that passed between the operating-system change and the security-software installation may be included with other health information obtained by health-evaluation module 114 and included in system-health assessment 400 in FIG. 4.

For example, as illustrated in system-health assessment 400 in FIG. 4: 1) 326 days may have passed since the operating system running on computing subsystem 210(1) was installed and 2) 215 days may have passed since security software was installed on computing subsystem 210(1). In this instance, health-evaluation module 114 may subtract the number of days since the security software was installed from the number of days since the operation system was installed to determine that computing subsystem 210(1) went 111 days without having security software installed.

At step 560, health-evaluation module 114 may assess the health of computing subsystem 210(1) based on how much time passed between the operating-system change identified in step 510 and the security-software installation identified in step 530. For example, health-evaluation module 114 may calculate or adjust a system-health score for computing subsystem 210(1) based on how much time passed between when the operating system on computing subsystem 210(1) was installed and when security software was subsequently installed. Step 560 may be similar to step 330 in FIG. 3, therefore, the discussion of step 330 may also apply to step 560. Upon completion of step 560 in FIG. 5, exemplary method 500 may terminate.

In some examples, health-evaluation module 114 may also compare the time of an operating-system change (e.g., an operating-system update or patch) with the time of a previous operating-system change (e.g., an operating-system installation) when assessing the health of a computing system. For example, since many operating-system patches and updates fix or remedy operating-system vulnerabilities, health-evaluation module 114 may compare the time that an operating-system patch was installed on a computing system with the time when the system's operating system was installed in order to determine how long the system was exposed to malware that took advantage of the vulnerabilities remedied by the operating-system patch.

Figure 6:
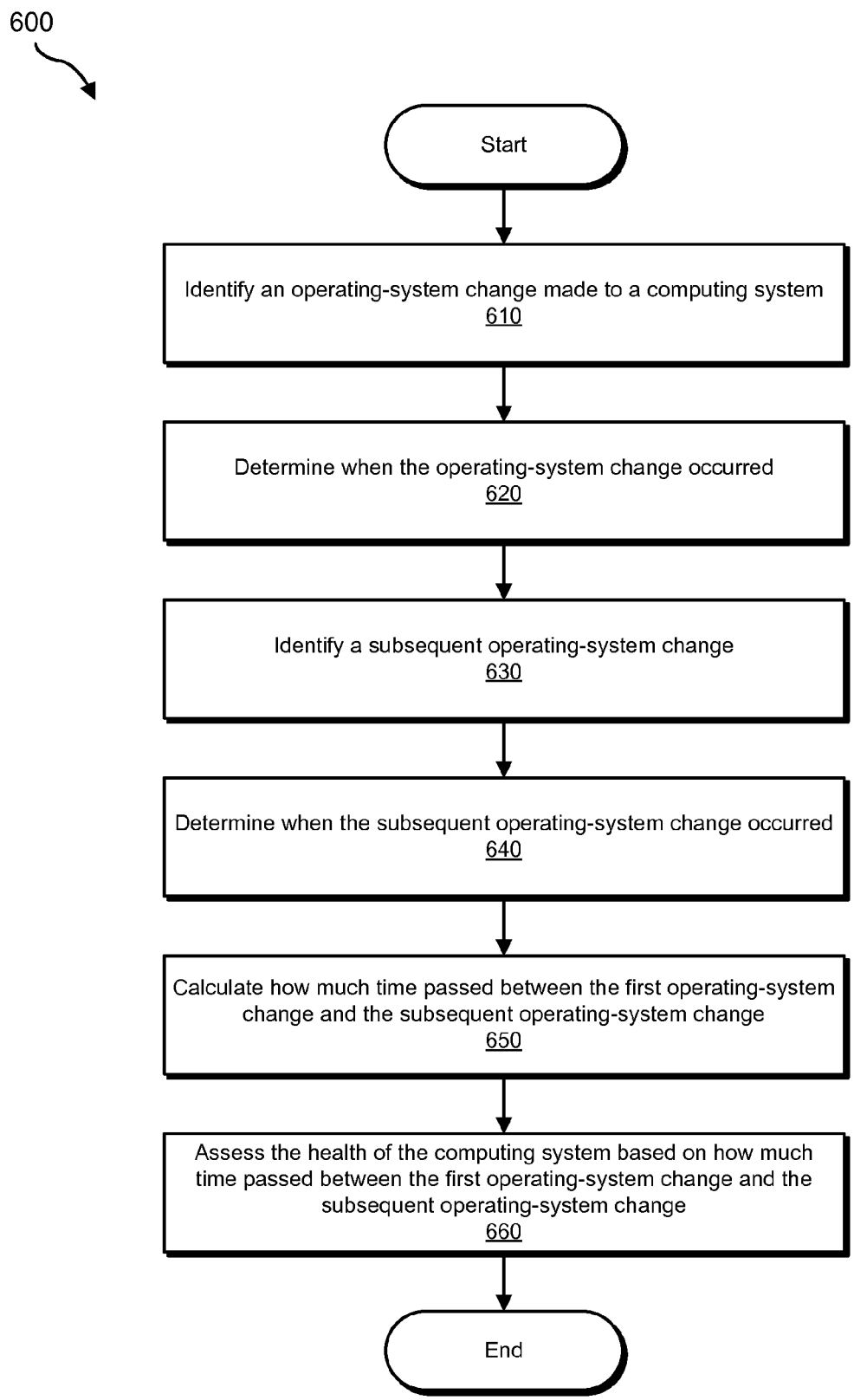
FIG. 6 is a flow diagram of an exemplary method for evaluating the health of computing systems based on when subsequent operating-system changes occur.

FIG. 6 illustrates an exemplary method 600 for evaluating the health of computing systems based on when two operating-system changes occur in relation to each other. As with FIGS. 3 and 5, the steps illustrated in FIG. 6 may be performed by any suitable computer-executable code and/or computing system. In some embodiments, the steps shown in FIG. 6 may be performed by one or more of the components of system 100 in FIG. 1 and/or system 200 in FIG. 2, as will be explained in greater detail below.

For example, at step 610 identification module 112(1) on computing subsystem 210(1) in FIG. 2 may identify an operating-system change (e.g., an operating-system installation) made to computing subsystem 210(1) and, at step 620, determine when this operating-system change occurred. At step 630, identification module 112(1) may also identify a subsequent operating-system change (e.g., an operating-system update) and, at step 640, determine when this operating-system change occurred. Steps 610, 620, 630, and 640 may be similar to steps 310 and 320 of FIG. 3. Therefore, the discussion of steps 310 and 320 may also apply to steps 610, 620, 630, and 640.

At step 650, health-evaluation module 114 may calculate how much time passed between the operating-system change identified in step 610 and the subsequent operating-system change identified in step 630. In some embodiments, health-evaluation module 114 may calculate how much time passed as part of assessing the health of a computing system. As such, the amount of time that passed between the first operating-system change and the subsequent operating-system change may be included with other health information obtained by health-evaluation module 114 and included in system-health assessment 400 in FIG. 4.

For example, as illustrated in system-health assessment 400 in FIG. 4: 1) 326 days may have passed since the operating system running on computing subsystem 210(1) was installed and 2) 21 days may have passed since an operating-system update was installed. In this instance, health-evaluation module 114 may subtract the number of days since the operating-system update from the number of days since the operation system was installed to determine that computing subsystem 210(1) went 305 days without the operating-system update.

At step 660, health-evaluation module 114 may assess the health of computing subsystem 210(1) based on how much time passed between the operating-system change identified in step 610 and the subsequent operating-system change identified in step 630. For example, health-evaluation module 114 may calculate or adjust a system-health score for computing subsystem 210(1) based on how much time passed between when the operating system on computing subsystem 210(1) was installed and when this operating system was subsequently updated. Step 660 may be similar to steps 330 in FIGS. 3 and 560 in FIG. 5, therefore, the discussion of steps 330 and 560 may also apply to step 660. Upon completion of step 660 in FIG. 6, exemplary method 600 may terminate.

The health assessments described and/or illustrated herein may be used for a variety of purposes. In some embodiments, security software may perform a security action based at least in part on the results of a health assessment of a computing system. For example, security software may prevent computing systems with dangerously low system-health scores from accessing resources (such as files, networks, or the like) within an enterprise in an attempt to prevent these unhealthy machines from infecting other machines within the enterprise. Security software may also revoke prior access rights to resources from computing systems with dangerously low system-health scores for similar reasons.

In other examples, a security-software application or system may calculate a reputation score (e.g., a value indicating the likelihood of being malicious) for an application or file based at least in part on the results of health assessments of computing systems that contain the application or file. For example, a security-software application or system may calculate a reputation score for an application or file by: 1) identifying a plurality of computing systems within a user base or enterprise that contain a copy of the application or file, 2) determining the health of each of the computing systems that contain the application or file, and then 3) calculating a reputation score for the application or file based at least in part on the health of the computing systems that contain the application or file.

For example, computing subsystem 220 in FIG. 2 (which may, as detailed above, represent a backend service) may determine that a file that is predominantly located on "healthy" computing systems (i.e., computing systems with high system-health scores and/or good system-health assessments) within a user base or enterprise is most likely safe. In this example, computing subsystem 220 may assign a high reputation score to the file in question. In contrast, if computing subsystem 220 determines that an application is predominantly installed on "unhealthy" computing systems (i.e., computing systems with low system-health scores and/or poor system-health assessments) within a user base or enterprise, then computing subsystem 220 may determine that this file has a high probability of being malicious and may assign a low reputation score to the same.

As explained in greater detail above, in some examples the health of a computing system may be assessed based at least in part on when an operating-system change occurred. As such, "healthy" computing systems may include computing systems that have newly installed operating systems, have security software that was installed soon after the operating system was installed, and/or have all possible operating-system updates and upgrades installed. Similarly, "unhealthy" computing systems may include computing systems that have operating systems that have been installed for long periods of time or that do not have security software, operating-system upgrades, and/or operating-system updates installed.

In some examples, computing subsystem 220 may share reputation scores for files and applications with each client within its user base or enterprise (e.g., computing subsystems 210(1)-(N)), which clients may in turn use this information in deciding whether to remove, quarantine, or allow files or applications to be loaded or installed. In some examples, computing subsystem 220 may also decide whether to add a file or application to a blacklist or whitelist based on the reputation score associated with the file or application.

By assessing the health of a computing system based at least in part on when various operating-system changes made to the computing system occurred (such as when the system's operating system was installed), the systems and methods described herein may be able to efficiently and accurately assess the state of health of computing systems. As explained above, these health assessments may enable security-software vendors to quickly and accurately predict the trustworthiness of a file or application, which may in turn enable security-software vendors to offer enhanced protection against malware.

Figure 7:
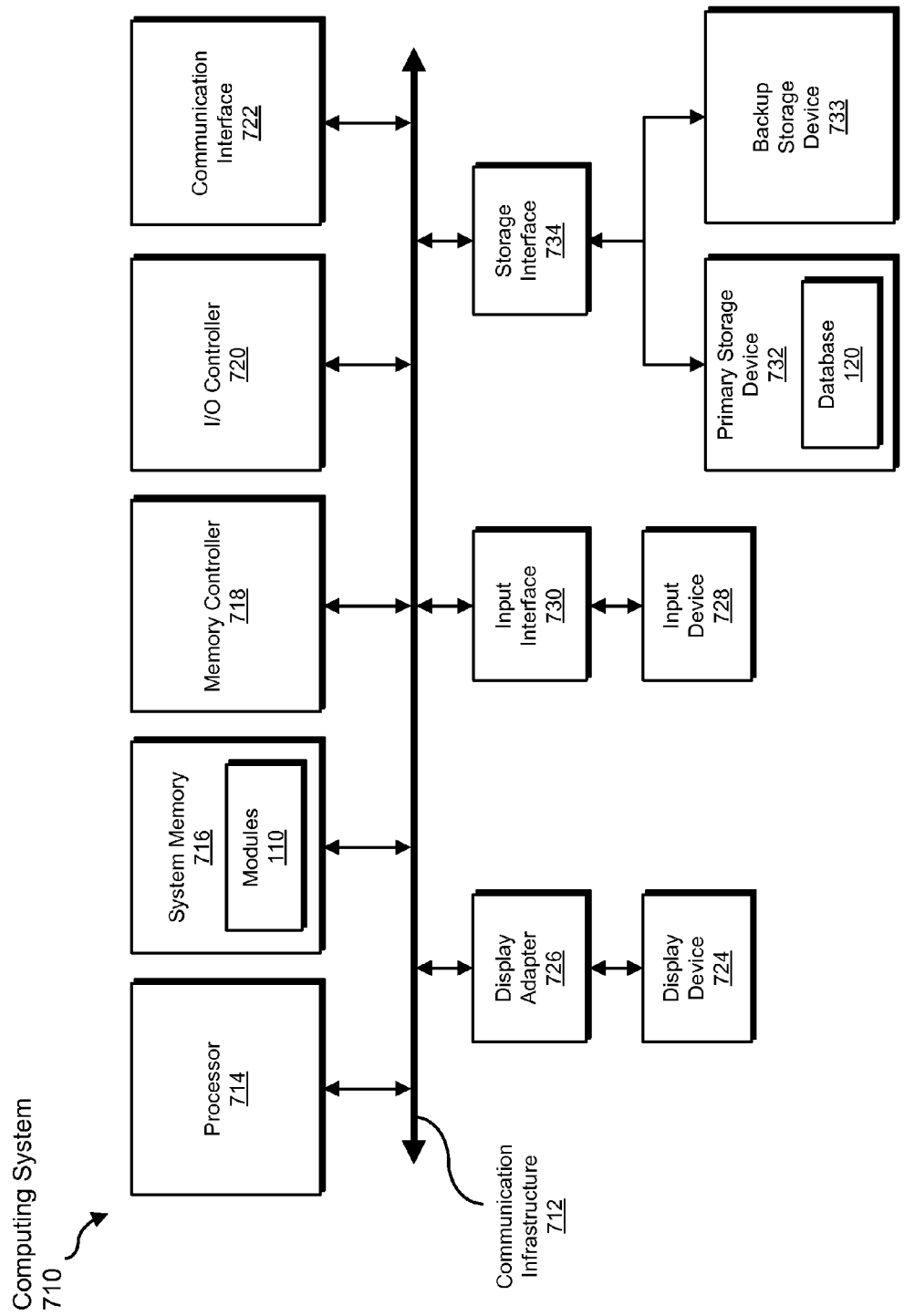
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the evaluating, identifying, determining, assessing, reading, calculating, adjusting, limiting, protecting, and performing steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory ("RAM"), read only memory ("ROM"), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). As shown, system memory 716 may also include modules 110 from FIG. 1.

In certain embodiments, exemplary computing system 710 may also include one or more components or elements in addition to processor 714 and system memory 716. For example, as illustrated in FIG. 7, computing system 710 may include a memory controller 718, an Input/Output ("I/O") controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as evaluating, identifying, determining, assessing, reading, calculating, adjusting, limiting, protecting, and performing.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the evaluating, identifying, determining, assessing, reading, calculating, adjusting, limiting, protecting, and performing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the evaluating, identifying, determining, assessing, reading, calculating, adjusting, limiting, protecting, and performing steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the evaluating, identifying, determining, assessing, reading, calculating, adjusting, limiting, protecting, and performing steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the evaluating, identifying, determining, assessing, reading, calculating, adjusting, limiting, protecting, and performing steps disclosed herein. Storage devices 732 and 733 may also be used to perform and/or be a means for performing other steps and features set forth in the instant disclosure. As shown, in some examples storage device 732 may include database 120 from FIG. 1.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit ("ASIC") adapted to implement one or more of the exemplary embodiments disclosed herein.

Figure 8:
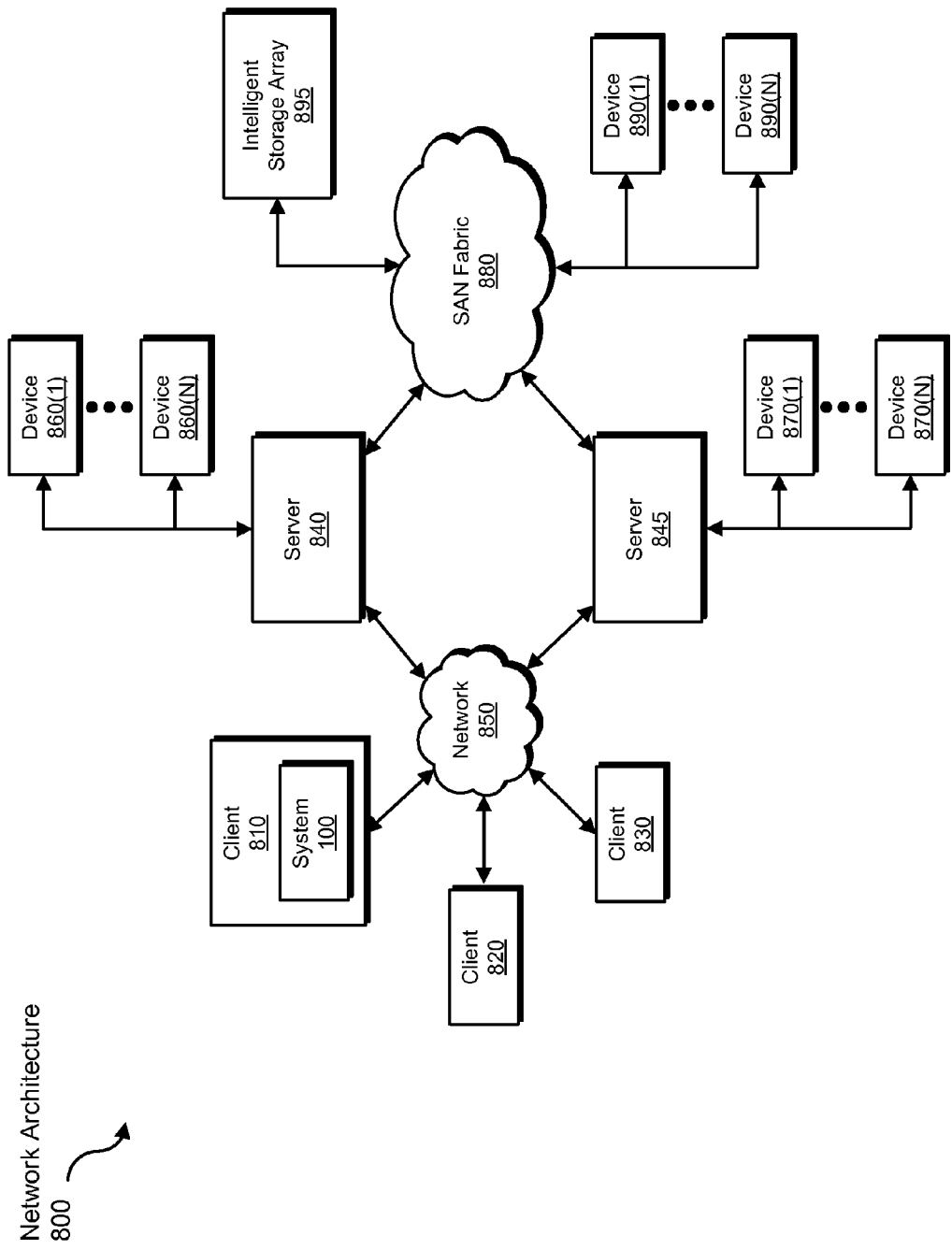
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as system 100 in FIG. 1, computing subsystems 210(1)-(N) and 220 in FIG. 2, and/or exemplary computing system 710 in FIG. 7. For example, as shown in FIG. 7, client 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network ("WAN"), a local area network ("LAN"), a personal area network ("PAN"), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage ("NAS") devices configured to communicate with servers 840 and 845 using various protocols, such as NFS, SMB, or CIFS.

Servers 840 and 845 may also be connected to a storage area network ("SAN") fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the evaluating, identifying, determining, assessing, reading, calculating, adjusting, limiting, protecting, and performing steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for evaluating the health of computing systems based on when operating-system changes occur. For example, a computing system (e.g., computing system 710 and/or one or more components of network architecture 800) may: 1) identify an operating-system change made to a computing system, 2) determine when the operating-system change occurred, and 3) assess the health of the computing system based at least in part on when the operating-system change occurred.

In some embodiments, the operating-system change may include an installation of an operating system, an update of the operating system, an upgrade of the operating system, and/or a security-software installation. In certain embodiments, the computing system may determine when the operating-system change occurred by reading the time of the operating-system change from the computing system's registry, by determining when a system file related to the operating-system change was created, and/or by determining when the system file was last modified.

In various embodiments, the computing system may assess the health of the computing system based on when the operating-system change occurred by: 1) calculating how much time has passed since the operating-system change and 2) assessing the health of the computing system based at least in part on how much time has passed since the operating-system change. In some embodiments, the computing system may assess the health of the computing system based on how much time has passed since the operating-system change by: 1) adjusting a system-health score associated with the computing system based on how much time has passed since the operating-system change and then 2) limiting the adjustment by a predetermined threshold.

In other embodiments, the computing system may assess the health of the computing system by calculating a system-health score for the computing system based on a predetermined gradient that accounts for how much time has passed since the operating-system change and/or by adjusting an existing system-health score associated with the computing system based on a predetermined gradient that accounts for how much time has passed since the operating-system change. In various embodiments, the computing system may assess the health of the computing system based at least in part on when the operating-system change occurred by calculating a system-health score for the computing system based at least in part on when the operating-system change occurred.

In certain embodiments, the computing system may: 1) identify a security-software installation, 2) determine when the security-software installation occurred, and then 3) calculate how much time passed between the operating-system change and the security-software installation. In some embodiments, the computing system may assess the health of the computing system by adjusting a system-health score associated with the computing system based on how much time passed between the operating-system change and the security-software installation.

In various embodiments, the computing system may: 1) identify a subsequent operating-system change, 2) determine when the subsequent operating-system change occurred, and then 3) calculate how much time passed between the operating-system change and the subsequent operating-system change. In at least one embodiment, the computing system may assess the health of the computing system by adjusting a system-health score associated with the computing system based on how much time passed between the operating-system change and the subsequent operating-system change.

In some embodiments, the computing system may protect, against tampering, data indicating when the operating-system change occurred. In other embodiments, the computing system may perform a security action based at least in part on the assessment of the health of the computing system. The security action may include allowing the computing system to access a resource, preventing the computing system from accessing the resource, and/or revoking access rights to the resource from the computing system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for evaluating computing-system health based on when operating-system changes occur, at least a portion of the method being performed by a computing system comprising at least one processor, the method comprising:
   identifying an operating-system change made to the computing system;
   determining when the operating-system change occurred by attempting to read the time of the operating-system change from the computing system's registry;
   assessing the computing system's health based at least in part on when the operating-system change occurred by:
      identifying a system-health score associated with the computing system that quantifies the health of the computing system;
      adjusting the system-health score associated with the computing system based at least in part on a predetermined gradient that accounts for how much time has passed since the operating-system change occurred;
      limiting the adjustment of the system-health score by a predetermined threshold.

2. The computer-implemented method of claim 1, wherein the operating-system change comprises at least one of:
   an installation of an operating system;
   an update of the operating system;
   an upgrade of the operating system;
   a security-software installation.

3. The computer-implemented method of claim 1, wherein determining when the operating-system change occurred further comprises at least one of:
   determining when a system file related to the operating-system change was created;
   determining when the system file was last modified;
   reading the time of the operating-system change from a log file associated with the computing system;
   recording the time of the operating-system change as the operating-system change occurs.

4. The computer-implemented method of claim 1, wherein assessing the health of the computing system further comprises:
   calculating how much time passed between when the operating-system change was made available to the computing system and when the operating-system change was actually made to the computing system;
   adjusting the system-health score associated with the computing system based at least in part on how much time passed between when the operating-system change was made available to the computing system and when the operating-system change was actually made to the computing system.

5. The computer-implemented method of claim 1, wherein identifying the system-health score associated with the computing system comprises at least one of:
   identifying an existing system-health score associated with the computing system;
   calculating a new system-health score for the computing system.

6. The computer-implemented method of claim 1, further comprising:
   identifying a security-software installation;
   determining when the security-software installation occurred;
   calculating how much time passed between the operating-system change and the security-software installation.

7. The computer-implemented method of claim 6, wherein assessing the health of the computing system further comprises adjusting the system-health score associated with the computing system based at least in part on how much time passed between the operating-system change and the security-software installation.

8. The computer-implemented method of claim 1, further comprising:
   identifying a subsequent operating-system change;
   determining when the subsequent operating-system change occurred;
   calculating how much time passed between the operating-system change and the subsequent operating-system change.

9. The computer-implemented method of claim 8, wherein assessing the health of the computing system further comprises adjusting the system-health score associated with the computing system based at least in part on how much time passed between the operating-system change and the subsequent operating-system change.

10. The computer-implemented method of claim 1, further comprising protecting, against tampering, data indicating when the operating-system change occurred.

11. The computer-implemented method of claim 1, further comprising performing a security action based at least in part on the assessment of the health of the computing system.

12. The computer-implemented method of claim 11, wherein the security action comprises at least one of:
- allowing the computing system to access a resource;
- preventing the computing system from accessing a resource;
- revoking access rights to a resource from the computing system.

13. A system for evaluating computing-system health based on when operating-system changes occur, the system comprising:
- an identification module programmed to:
  - identify an operating-system change made to a computing system;
  - determine when the operating-system change occurred by attempting to read the time of the operating-system change from the computing system's registry;
- a health-evaluation module programmed to assess the computing system's health based at least in part on when the operating-system change occurred by:
  - identifying a system-health score associated with the computing system that quantifies the health of the computing system;
  - adjusting the system-health score associated with the computing system based at least in part on a predetermined gradient that accounts for how much time has passed since the operating-system change occurred;
  - limiting the adjustment of the system-health score by a predetermined threshold;
- one or more processors configured to execute the identification module and the health-evaluation module.

14. The system of claim 13, wherein the identification module is further programmed to determine when the operating-system change occurred by at least one of:
- determining when a system file related to the operating-system change was created;
- determining when the system file was last modified;
- reading the time of the operating-system change from a log file associated with the computing system;
- recording the time of the operating-system change as the operating-system change occurs.

15. The system of claim 13, wherein the health-evaluation module further assesses the health of the computing system by adjusting the system-health score associated with the computing system based at least in part on how much time passed between the operating-system change and a security-software installation.

16. The system of claim 13, wherein the health-evaluation module further assesses the health of the computing system by:
- calculating how much time passed between when the operating-system change was made available to the computing system and when the operating-system change was actually made to the computing system;
- adjusting the system-health score associated with the computing system based at least in part on how much time passed between when the operating-system change was made available to the computing system and when the operating-system change was actually made to the computing system.

17. The system of claim 13, wherein the health-evaluation module further assesses the health of the computing system by adjusting the system-health score associated with the computing system based at least in part on how much time passed between the operating-system change and a subsequent operating-system change.

18. A non-transitory computer-readable-storage medium comprising one or more computer-executable instructions that, when executed by at least one processor of a computing device, cause the computing device to:
- identify an operating-system change made to a computing system;
- determine when the operating-system change occurred by attempting to read the time of the operating-system change from the computing system's registry;
- assess the computing system's health based at least in part on when the operating-system change occurred by:
  - identifying a system-health score associated with the computing system that quantifies the health of the computing system;
  - adjusting the system-health score associated with the computing system based at least in part on a predetermined gradient that accounts for how much time has passed since the operating-system change occurred;
  - limiting the adjustment of the system-health score by a predetermined threshold.

\* \* \* \* \*